US012701343B2

(12) United States Patent
    Jakobson et al.

(10) Patent No.: US 12,701,343 B2
(45) Date of Patent: Aug. 4, 2026

(54) PIXEL READOUT CIRCUIT

(71) Applicant: SEMICONDUCTOR DEVICES LTD, Misgav (IL)

(72) Inventors: Claudio Gabriel Jakobson, Karmiel (IL); Roman Dobromislin, Haifa (IL); Nimrod Ben-Ari, Gilon (IL)

(73) Assignee: SEMICONDUCTOR DEVICES LTD, Misgav (IL)

( * ) Notice: Subject to any disclaimer, the term of this patent is extended or adjusted under 35 U.S.C. 154(b) by 98 days.

(21) Appl. No.: 18/666,295

(22) Filed: May 16, 2024

(65) Prior Publication Data

US 2024/0397238 A1     Nov. 28, 2024

(30) Foreign Application Priority Data

May 24, 2023     (IL) .......................................... 303189

(51) Int. Cl.
    H04N 25/78          (2023.01)
    H04N 25/703         (2023.01)
(52) U.S. Cl.
    CPC ........... H04N 25/78 (2023.01); H04N 25/703 (2023.01)
(58) Field of Classification Search
    CPC ..... G01S 7/4865; G01S 17/894; H04N 25/47; H04N 25/707; H04N 25/7795
    See application file for complete search history.

(56) References Cited

U.S. PATENT DOCUMENTS

| | | | |
|---|---|---|---|
| 9,215,386 B2 | 12/2015 | Elkind et al. | |
| 2012/0261553 A1* | 10/2012 | Elkind .................. | F41G 7/2293 |
| | | | 250/208.1 |
| 2016/0282179 A1 | 9/2016 | Nazemi et al. | |
| 2017/0094250 A1 | 3/2017 | Williams et al. | |
| 2018/0041727 A1 | 2/2018 | Lund et al. | |
| 2021/0360184 A1 | 11/2021 | Jakobson et al. | |

FOREIGN PATENT DOCUMENTS

| | | |
|---|---|---|
| EP | 4329290 A1 | 2/2024 |
| WO | 2022222170 A1 | 10/2022 |
| WO | 2023041610 A1 | 3/2023 |

\* cited by examiner

*Primary Examiner* — Thanh Luu
(74) *Attorney, Agent, or Firm* — Ballard Spahr LLP

(57)          ABSTRACT

An imaging system including: an optical detector pixel array configured to provide a plurality of optical measurement signals of a field of view (FOV); a pixel circuitry array (PCA) comprising a plurality of pixel circuits, each pixel circuit associated with a pixel of said optical detector pixel array and configured to receive an optical measurement signal of said plurality of optical measurement signals; at least one electrical connection to and shared by at least two pixel circuits of said plurality of pixel circuits, said at least two pixel circuits associated with at least two detector pixels of said detector pixel array respectively; and a detection circuitry configured to detect electrical fluctuation associated with receipt at said optical detector pixel array of a pulse of laser light.

20 Claims, 6 Drawing Sheets

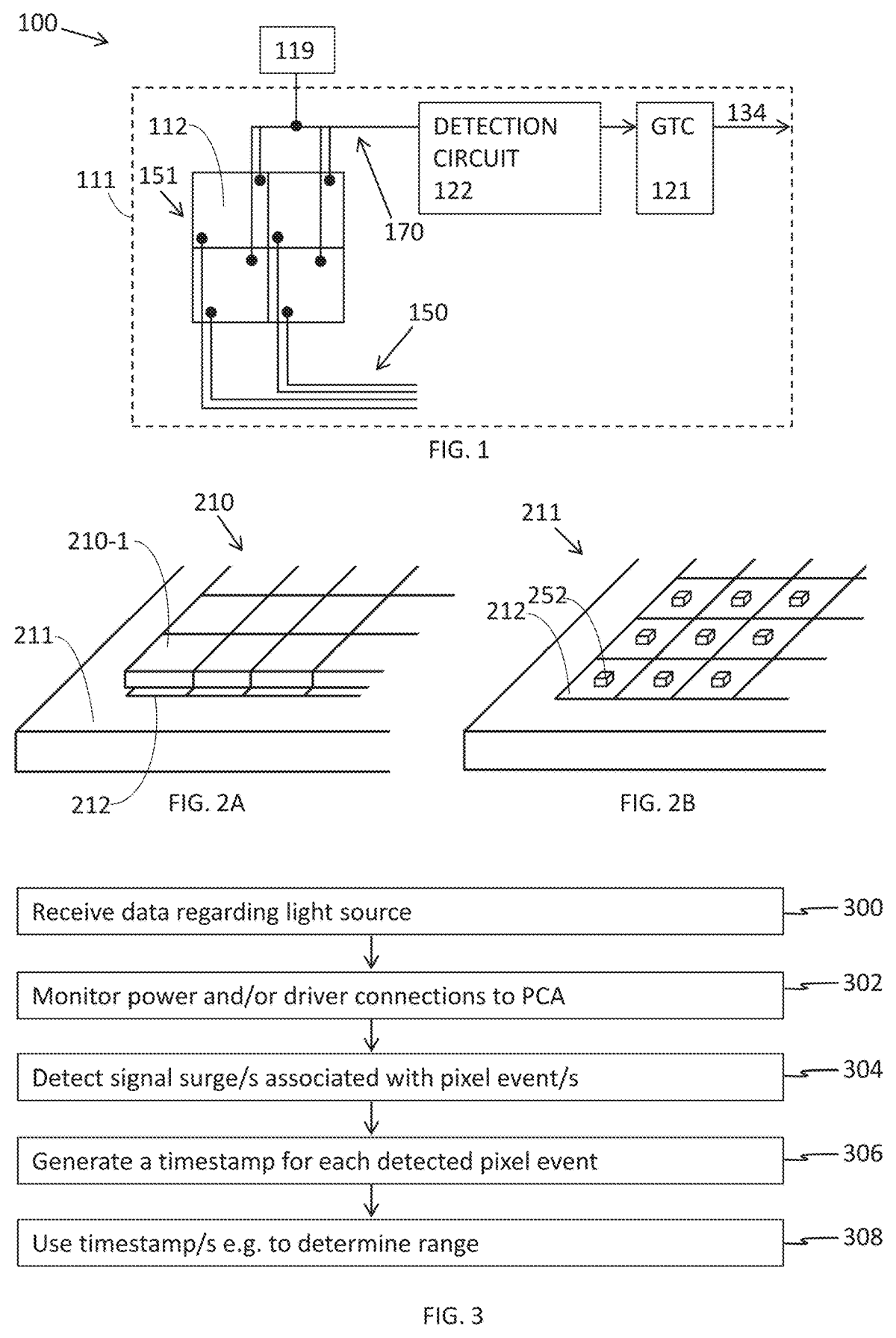

100

119

112

111 151

170

DETECTION CIRCUIT 122

GTC 121

| Receive data regarding light source | 300 |
| Monitor power and/or driver connections to PCA | 302 |
| Detect signal surge/s associated with pixel event/s | 304 |
| Generate a timestamp for each detected pixel event | 306 |
| Use timestamp/s e.g. to determine range | 308 |

FIG. 3

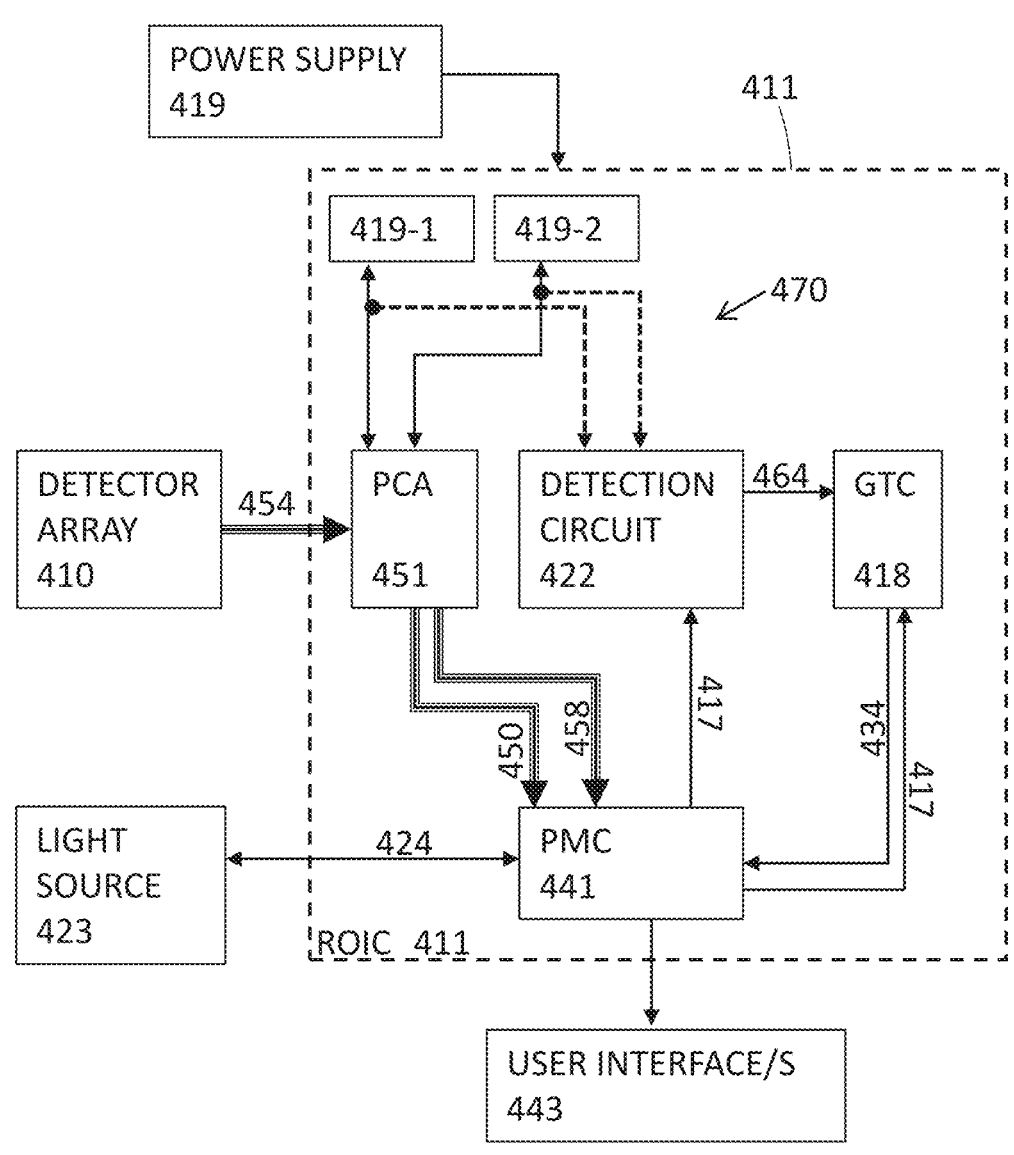
FIG. 4

Timing information regarding emission of a laser pulse is received    500

Detect signal surge associated with arrival of reflected laser pulse to detector array.    502

Detect light using array of detectors to provide a per pixel measurement signal    504

Determine range based on timing of signal surge with respect to time of emission of the laser pulse    505

Process measurement signals to produce detection data, produce detection frame    506

Process measurement signals to produce image data, produce image    508

Combine detection data with timing data    510

Optionally combine detection and timing data with image data    512

FIG. 5

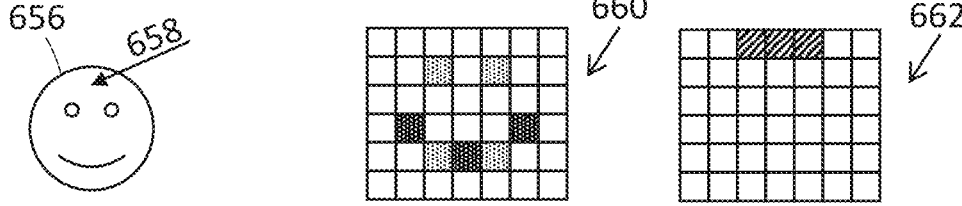

Accumulator
726

Buffer
727

750

719

Front-End
Circuit
725

754

770a

770

722

Pre-processing
Unit
728

Comparator
730

Latch

731

GTC
718

734

758

768

729

751

717

LASER
723

724

PMC
741

Disable pixel event detection — 800

Synchronize with laser light source — 802

Enable pixel event detection — 804

Optionally, disable pixel event detection — 806

PIXEL READOUT CIRCUIT

TECHNOLOGICAL FIELD

The present disclosure, in some embodiments thereof, relates to pixel readout circuits and, more particularly, but not exclusively, to pixel readout integrated circuits for use with a focal plane array (FPA) of optical detector pixels.

BACKGROUND ART

U.S. Pat. No. 9,215,386 discloses "The present invention provides a pixel readout integrated circuit (ROIC) to be integrated with an active matrix light detector (photodiode) of any type creating an advanced multi-function infrared detector with on-chip processing. The present invention also provides a new type of detector comprising a Readout Integrated Circuit (ROTC) with advanced on-chip signal processing . . . . More specifically, the readout circuit is capable of simultaneously or almost simultaneously implementing two different modes, an imaging mode and an event detection mode per pixel, which is implemented by processing data of the same frame. In the single-pixel event detection mode, the readout circuit identifies a specific event as a positive change in photocurrent, which might be indicative of the existence of a laser pulse or weapon fire pulse being any electromagnetic radiation pulse converted to current by the detector element. Due to the fact that such fast event detection is carried out concurrently with acquiring an image of the same frame, the fast event is not only detected but its location in the frame being imaged from the region of interest can also be determined, and, moreover, at the pixel-size resolution."

Additional background art includes U.S. Pat. No. 9,215,386, and US Patent Application Publication No. US2021/0360184.

Acknowledgement of the above references herein, each of which is incorporated by reference in its entirety to this document, is not to be inferred as meaning that these are in any way relevant to the patentability of the presently disclosed subject matter.

GENERAL DESCRIPTION

Following is a non-exclusive list of some exemplary embodiments of the disclosure. The present disclosure also includes embodiments which include fewer than all the features in an example and embodiments using features from multiple examples, even if not listed below.

Example 1. An imaging system comprising:
an optical detector pixel array configured to provide a plurality of optical measurement signals of a field of view (FOV);
a pixel circuitry array (PCA) comprising a plurality of pixel circuits, each pixel circuit associated with a pixel of said optical detector pixel array and configured to receive an optical measurement signal of said plurality of optical measurement signals;
at least one electrical connection to and shared by at least two pixel circuits of said plurality of pixel circuits, said at least two pixel circuits associated with at least two detector pixels of said detector pixel array respectively; and
a detection circuitry configured to detect electrical fluctuation associated with receipt at said optical detector pixel array of a pulse of laser light.

Example 2. The imaging system according to Example 1, comprising a global timing circuitry configured to timestamp said electrical fluctuation.

Example 3. The imaging system according to any one of Examples 1-2, wherein said connection is a power supply connection to said at least two pixel circuits.

Example 4. The imaging system according to any one of Examples 1-2, wherein said connection is a reference voltage supplied to said at least two pixel circuits.

Example 5. The imaging system according to any one of Examples 1-4, wherein said detection circuitry is configured to associate said electrical fluctuation with one or more of said plurality of pixel circuits.

Example 6. The imaging system according to any one of Examples 2-5, wherein said global timing circuitry is configured to associate said timestamp with one or more of said plurality of pixel circuits.

Example 7. The imaging system according to any one of Examples 1-6, wherein more than one of plurality of pixel circuits each have a detection channel of a plurality of detection channels.

Example 8. The imaging system according to Example 7, wherein said plurality of detection channels provide detection data.

Example 9. The imaging system according to Example 8, wherein said plurality of detection channels are configured to pass said detection data to one or more frame maker for construction of a detection frame, where each detection channel is associated with a pixel of said detection frame.

Example 10. The imaging system according to any one of Examples 7-9, wherein said timestamp is associated with one or more pixels of said detection frame.

Example 11. The imaging system according to any one of Examples 7-10, wherein said connection is a connection to more than one detection channel of said plurality of detection channels.

Example 12. The imaging system according to any one of Examples 7-10, wherein at least a proportion of said plurality of pixel circuits each has an imaging channel configured to provide image data.

Example 13. The imaging system according to Example 12, wherein said detection data and said image data are provided associated with each other.

Example 14. The imaging system according to Example 13, wherein each pixel of said detection data is associated with one or more pixels of said image data.

Example 15. The imaging system according to any one of Examples 2-14, configured to communicate with a laser source configured to direct pulses of laser light towards said FOV, at known times.

Example 16. The imaging system according to Example 15, wherein said receipt at said optical detector pixel array is of portion of a pulse of laser light emitted by said laser source and reflected by an object within said FOV.

Example 17. The imaging system according to any one of Examples 15-16, comprising processing and memory circuitry configured to determine a range between one or more component of said system and said object using said timestamp and said known times.

Example 18. The imaging system according to any one of Examples 2-17, wherein said detection circuitry is configured to detect a plurality of surges in power consumption;

wherein said global timing circuitry is configured to provide a plurality of timestamps, a timestamp for each of said plurality of surges.

Example 19. The imaging system according to any one of Examples 1-18, wherein said PCA includes a plurality of pixel circuits each having an imaging channel.

Example 20. The imaging system of Example 19, comprising processing and memory circuitry (PMC); and wherein each said imaging channel is configured to pass image data to an image processing unit for construction of an image.

Example 21. The imaging system according to any one of Examples 18-19, comprises processing and memory circuitry (PMC) configured to identify a laser source using said plurality of timestamps.

Example 22. The imaging system according to any one of Examples 2-21, wherein said global timing circuitry comprises a counter where the counter value upon detection of said fluctuation provides said timestamp.

Example 23. The imaging system according to Example 22, wherein said counter is reset upon detection of said fluctuation.

Example 24. The imaging system according to any one of Examples 2-21, wherein said global timing circuitry comprises a counter which is initiated upon detection of said fluctuation;

wherein a counter value upon detection of a subsequent second fluctuation provides a time measure between detected fluctuations.

Example 25. A ROIC comprising:

a pixel circuitry array (PCA) comprising a plurality of pixel circuits, each pixel circuit configured to receive an optical measurement signal from a detector of an optical detector pixel array;

a detection circuitry configured to detect electrical fluctuation associated with receipt at said optical detector pixel array of a pulse of laser light; and a global timing circuitry configured to timestamp said electrical fluctuation in power consumption.

Example 26. The ROIC according to Example 25, comprising at least one driver configured to supply power to said plurality of pixel circuits; and wherein said detection circuitry is configured to detect said electrical fluctuation in power consumption at one or more connections between said driver and said plurality of pixel circuits.

Example 27. A method of imaging comprising:

acquiring a plurality of measurement signals of a field of view (FOV) using an array of optical detectors each detector producing a measurement signal of said plurality of measurement signals; and detecting and timestamping an electrical fluctuation associated with receipt of a pulse of laser light at said array of optical detectors.

Example 28. An imaging system comprising:

an optical detector pixel array configured to provide a plurality of optical measurement signals of a field of view (FOV);

a pixel circuitry array (PCA) comprising a plurality of pixel circuits, each pixel circuit associated with a pixel of said optical detector pixel array and configured to receive an optical measurement signal of said plurality of optical measurement signals;

at least one electrical connection to and shared by at least two pixel circuits of said plurality of pixel circuits, said at least two pixel circuits associated with at least two detector pixels of said detector pixel array respectively;

a detection circuitry configured to detect electrical fluctuation associated with receipt at said optical detector pixel array of a pulse of laser light;

a global timing circuitry configured to provide a timestamp of said electrical fluctuation which timestamp is associated with one or more of said plurality of pixel circuits;

a plurality of detection channels, each associated with a pixel circuit of said plurality of pixel circuits and configured to provide detection data, each pixel of which is associated with a pixel circuit of said plurality of pixel circuits; and a plurality of imaging channels, each associated with a pixel circuit of said plurality of pixel circuits and configured to provide image data, each pixel of which is associated with a pixel circuit of said plurality of pixel circuits.

Unless otherwise defined, all technical and/or scientific terms used within this document have meaning as commonly understood by one of ordinary skill in the art/s to which the present disclosure pertains. Methods and/or materials similar or equivalent to those described herein can be used in the practice and/or testing of embodiments of the present disclosure, and exemplary methods and/or materials are described below. Regarding exemplary embodiments described below, the materials, methods, and examples are illustrative and are not intended to be necessarily limiting.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 1 is a simplified schematic of a portion of an imaging system, according to some embodiments of the disclosure;

FIG. 2A is a simplified schematic of a portion of a detector array and a ROIC, according to some embodiments of the disclosure;

FIG. 2B is a simplified schematic of a ROIC, according to some embodiments of the disclosure;

FIG. 3 is a method according to some embodiments of the disclosure;

FIG. 4 is a simplified schematic block diagram of an imaging system, according to some embodiments of the disclosure;

FIG. 5 is a method of imaging and detection, according to some embodiments of the disclosure;

FIG. 6 includes simplified schematic illustrations of imaging, according to some embodiments of the disclosure;

In some embodiments, although non-limiting, in different figures, like numerals are used to refer to like elements, for example, element 112 in FIG. 1 corresponding to element 212 in FIG. 2.

DETAILED DESCRIPTION OF EMBODIMENTS

Figures 7, 8:
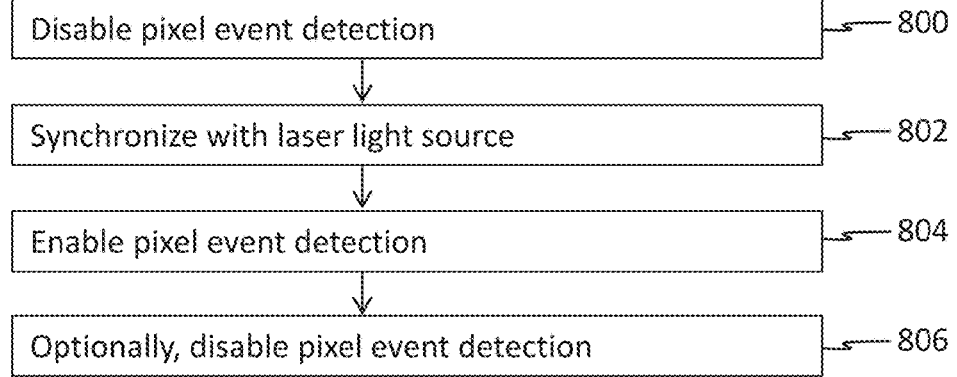
FIG. 7 is a simplified schematic of a portion of a system including a plurality of pixel circuits and a detection circuit, according to some embodiments of the disclosure.
FIG. 8 is a detection method, according to some embodiments of the disclosure.

The present disclosure, in some embodiments thereof, relates to pixel readout circuits and, more particularly, but not exclusively, to pixel readout integrated circuits for use with a focal plane array (FPA) of optical detector pixels.

Overview

A broad aspect of some embodiments of the disclosure relates to using a focal plane array (FPA) having a plurality of pixel detectors and circuitry of a readout integrated circuit (ROIC) coupled to the FPA to detect timing of receipt of laser light pulses/s at a global level, global defined as for more than one pixel. For example, in addition to using the FPA for imaging and/or to provide array-based detection of laser pulse/s.

An aspect of some embodiments of the disclosure relates to monitoring one or more connection to pixel circuits of the ROIC, surge/s in voltage level and/or current passing through the connection being used to identify timing of arrival of laser light to pixel/s of the FPA.

Without wanting to be bound by theory, it is theorized, that upon receipt of laser light to a pixel detector, circuitry associated with imaging and/or detection experiences power surges where e.g. voltage level of the connection and/or current through the connection change. Where, in some embodiments, a pixel event is detectable as a short high intensity change.

In some embodiments, other circuitry e.g. not directly connected, will experience a similar surge e.g. it is theorized, associated with parasitic effect/s. Where, in some embodiments, pixel events are identified by monitoring one or more shared connections to a plurality of individual pixel circuits.

Where, in some embodiments, connections include voltage and/or current at one or more of supply, bias, reference, threshold, control signal/s, and ground leakage.

In an exemplary embodiment, surges are detected at a connection to a latch of detection circuitry. Where the latch changes state upon detection of light by a detection pixel, and the change in state causes an associated fluctuation in power supply and/or biasing to the latch. In some embodiments, connections are shared by more than one pixel circuit meaning, potentially, that a plurality of pixels may be monitored at one time. Potentially, identifying pixel events from the surges detected at connections provides more accurate (and/or rapid) timing information regarding arrival of light to the detector array e.g. as the measurement is not delayed by a time required to read values from detection circuitry. For example, detection of a surge in a shared connection is more rapid than that which requires reading measurement values from individual pixels, for example, reading including sequential reading e.g. row by row.

In some embodiments, at least two different types of signal from measurement pixels of a focal plane array (FPA) of optical detector pixels are identified (e.g. including feature/s as described in U.S. Pat. No. 9,215,386 which is herein incorporated by reference in its entirety).

Where, for example, individual pixel measurement signals are processed to provide both imaging data (e.g. by integrating the signal) regarding a first signal within the sensed light and detector data (e.g. by responding to a fast variation in intensity of the signal) regarding receipt of a second signal within the sensed light. Where, in some embodiments, the first signal is associated with measurement of visible and/or shortwave infrared SWIR light. Where, in some embodiments, the second signal of light is associated with measurement one or more pulse of laser.

Where, in some embodiments, the surge detected is associated with more than one pixel e.g. in some embodiments, global power consumption signal/s (e.g. global to a region of the FPA including more than one pixel e.g. global to the entire detector array) are used to provide timing of arrival of the second signal. For example, where, in some embodiments, identification of the characteristic surge includes storing a timing of the surge (e.g. generating a timestamp).

An aspect of some embodiments relates to emission of the second signal at a known time towards a field of view (FOV) of the detector array, where detection data includes detection of reflection of the emitted second signal by one or more object in the FOV. In some embodiments, identified timing of arrival of the second signal to the detector is used to determine a distance (also herein termed "range") to the object e.g. between the object and the detector array.

In some embodiments, additionally or alternatively to timing of arrival, location within the detector array and/or intensity, and/or number of pixels sensing arrival of the second signal are used to augment image data.

For example, in some embodiments, determined range is provided (e.g. for display) along with imaging and/or detection data. Where, for example, display provides an indication of distance to the object along with location of the object e.g. within a field of view of the detection and/or image data.

Arrival of a pulse of the second signal at pixel/s of the detector array is herein termed a "pixel event" and/or pixel/s to which the light pulse arrive are termed "active pixel/s".

An aspect of some embodiments relates to measuring time between adjacent pixel events. For example, in some embodiments, to extract a light source modulation signal. Where, in some embodiments, the second signal has a characteristic signature, which is identifiable from characteristics of pulses of the second signal arriving at the detector array. For example, in some embodiments, a laser source has characteristic time modulated pulses, the modulation of which, in some embodiments, is determined (e.g. to identify the laser source) from timing of detected pixel events at the detector.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

FIG. 1 is a simplified schematic of a portion of an imaging system 100, according to some embodiments of the disclosure.

In some embodiments, system 100 includes an array (also herein termed "focal plane array (FPA)" and "photodetector array") of photodetectors, also herein termed "optical detectors", "optical sensors", "detectors", and "pixels" (not illustrated).

In some embodiments, system 100 includes a readout integrated circuit (ROIC) 111 including an array 151 of pixel circuits 112.

Where, in some embodiments, each detector of the photodetector array is associated with a pixel circuit 112 of the pixel circuit array (PCA) 151. In some embodiments, each photodetector is associated with a single corresponding pixel circuit 112 of PCA 151 e.g. as illustrated in and/or described regarding FIGS. 2A-B.

In some embodiments, ROIC 111 includes an infrared imaging ROIC used for reading detectors of a particular type hybridized to a FPA and used to generate image/s. In some embodiments, ROIC 111 one or more of; accumulates photocurrent from each pixel, drives the photocurrent signal outside the pixel matrix, converts the photocurrent signal to digital, and drives the signal through a link to provide a signal e.g. for readout and/or display.

In some embodiments, ROIC 111 stores signal charge at each pixel and then routes the signal onto output taps for readout.

In some embodiments, ROIC 111 has high-speed analog outputs to transmit pixel data outside of the integrated circuit. In some embodiments, analog-to-digital conversion (ADC) is implemented and digital outputs are provided where, optionally the ADC is provided on-chip within ROIC 111.

Although, PCA 151, which is for simplicity of illustration includes in FIG. 1 four pixel circuits 112, in some exemplary embodiments, PCA 151 includes 100 k-20M pixel circuits, or 300 k-10M pixel circuits, or 300 k-5M pixel circuits, or lower, or higher, or intermediate numbers, or ranges.

In some embodiments, the detector array and PCA 151 produce a measurement signal 150 for each of the detectors.

In some embodiments, system 100 includes a detection circuit 122 coupled to a one or more element 119. Where element/s 119 include, in some embodiments, a power supply connection to PCA 151. Where element/s 119 include, in some embodiments, driver/s e.g. providing control signals e.g. reference voltage/s. Which detection circuit 122 is configured to detect fluctuations (e.g. timing of the fluctuations) in electrical connection/s to pixel circuits 112 of PCA 151 associated with pixel events.

Although FIG. 1 illustrates a single detection circuit 122 for all of the pixel circuits 112, in some embodiments, system 100 includes a plurality of detection circuits 122, each detection circuit configured to detect pixel events associated with a plurality of pixel circuits.

In some embodiments, system 100 includes a global timing circuit 121 which, upon receiving a signal from detection circuit 122 indicating a pixel event, generates and optionally saves a timestamp signal 134 for the pixel event.

FIG. 2A is a simplified schematic of a portion of a detector array 210 and a ROIC 211, according to some embodiments of the disclosure.

FIG. 2B is a simplified schematic of a ROIC 211, according to some embodiments of the disclosure.

FIG. 2A illustrates a focal plane array 210, which comprises an array of optical detectors 210-1 e.g. semiconductor detectors, also herein interchangeably termed "detectors", "pixels", and "sensors".

In some embodiments, FIG. 2B illustrates the ROIC 211 of FIG. 2A, where the detector array 210 has been removed to reveal an array of elements 252 each of which connects a detector 210-1 to an associated pixel circuit 212. Where, in an exemplary embodiment, one or more of connectors 252 includes an indium bump.

In some embodiments, ROIC 211 includes a plurality of pixel circuits 212, where, in some embodiments, a single pixel circuit 212 is associated with each detector 210-1 of detector array 210 to form an FPA hybridized ROIC.

In some embodiments, one or more of pixel circuits 212 one or more of integrates, amplifies, and multiplexes charge on associated detector/s 210-1, the charge, for example, associated with photons striking detector 210-1.

FIG. 3 is a method according to some embodiments of the disclosure.

At 300, in some embodiments, data regarding a light source is received.

For example, timing regarding emission of laser light pulse/s e.g. laser light emitted by light source 423 FIG. 4.

For example, information regarding (e.g. a signature of) a light source received at a detector. Where, in some embodiments, the signature includes data regarding modulation of pulses of a pulsed laser source detected by the detector. For example, time modulation data.

At 302, in some embodiments, power consumption is monitored. For example, where monitoring is at one or more power connection to one or more portion of a system (e.g. system 100 FIG. 1, e.g. system 400 FIG. 4, e.g. system 700 FIG. 7).

Where, in some embodiments, monitoring includes monitoring one or more of connection for electrical fluctuations e.g. fluctuation in voltage level and/or current passing through the connection. Where, in some embodiments, the connection is compared to threshold/s to identify. Where exemplary comparison circuitry is illustrated in and/or described regarding FIG. 9A and/or FIG. 9B.

At 304, in some embodiments, an electrical fluctuation associated with a pixel event is detected.

In some embodiments, detecting includes identifying that a power supply voltage is over a threshold value. Alternatively or additionally, in some embodiments, detecting includes identifying that a power supply current is above a threshold value.

At 306, in some embodiments, upon detecting a pixel event at step 302, a timestamp and/or time measure is generated.

In some embodiments, detection is during a time frame, where, in some embodiments, a time frame is initiated by a trigger signal.

In some embodiments, the time frame is terminated by a trigger signal. Alternatively or additionally, in some embodiments, termination of the time frame occurs when the time measured exceeds a predefined maximum value. The maximum value, in some embodiments, corresponding to a maximal permitted range of the rangefinder.

In some embodiments, once a pixel event is detected in a frame, a counter is used to provide the timestamp then, optionally, is terminated (also herein termed "reset").

In some embodiments, a plurality of timestamps are generated, for example, each timestamp associated with a different laser light detection. For example, in some embodiments, when a pixel event is detected in a frame, a value at a counter element is used to provide the timestamp, for example, multiple times in a frame. Where, in some embodiments, after a duration of the frame, the counter is reset.

Figure 9A:
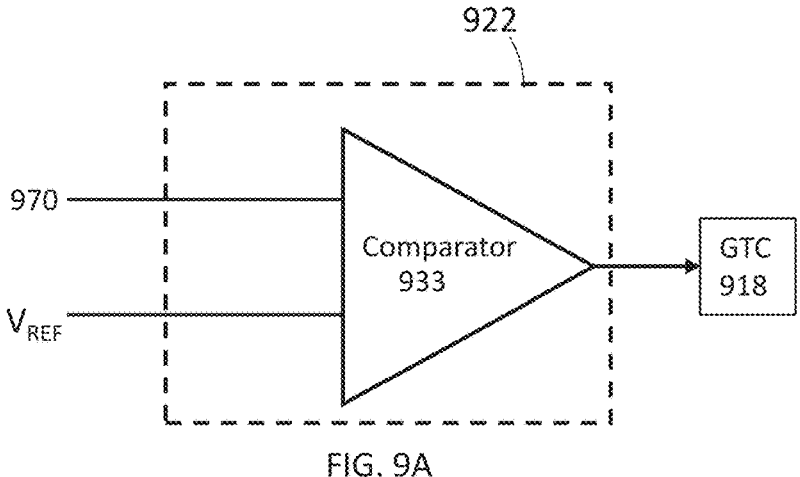
FIG. 9A is a simplified schematic of a detection circuit; according to some embodiments of the disclosure.
Figure 9B:
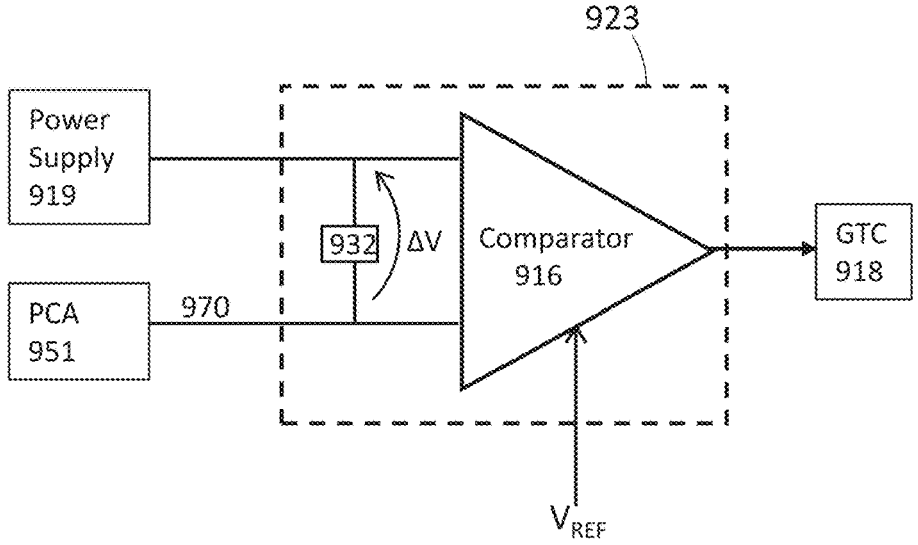
FIG. 9B is a simplified schematic of a detection circuit, according to some embodiments of the disclosure.
Figure 9C:
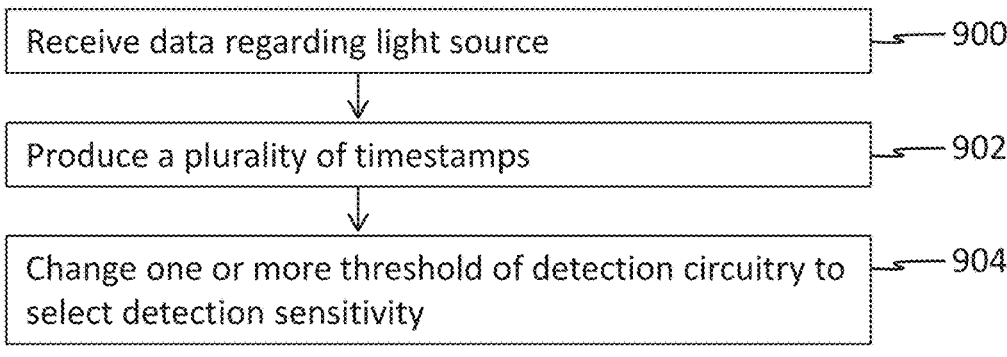
FIG. 9C is a calibration method, according to some embodiments of the disclosure.

For example, during calibration, in some embodiments, a plurality of timestamps are produced e.g. as described in FIG. 9C.

In some embodiments, a time measure is generated. For example, where the time measure is indicative of a time between two events. In some embodiments, the time measure is of a time duration between pixel events. Where, for example, in some embodiments, a counter is started upon detection of a pixel event. Where, in some embodiments, the counter is then stopped (and optionally rest) upon detection of a subsequent pixel event, the value of the counter e.g. providing a time measure of time elapsed between pixel events.

In some embodiments, both timestamp/s for pixel events and time measure/s between pixel events are provided e.g. as inputs to a display.

In some embodiments, detection includes detecting an intensity of light of the pixel event/s. Where, in some embodiments, a signal including a timestamp and an intensity is passed to processing and memory circuitry (PMC) which PMC, for example, includes one or more controller. Where, in some embodiments, PMC processes signal/s and/or outputs and/or provides data e.g. for display to a user. An exemplary portion of PMC is illustrated, for example, in FIG. 10.

In some embodiments, detection of intensity of a pixel event includes measuring an analog intensity signal.

At 308, in some embodiments, the timestamp is used. For example, to determine a range to an object. For example, to extract a light source modulation signal (e.g. in PRF techniques). For example, where the timestamp is used to wake a system functionality.

In some embodiments, the timestamp along with timing information received at step 300 is used to determine a range to an object reflecting the laser pulse/s e.g. range between the object and the laser emitting the pulses.

In some embodiments, the timestamp along with a location (e.g. region, the region, for example, having a size of more than one pixel) of the pixel event in which the timestamp is produced are used to provide an indication of a location of an object in the FOV of the detector array. Where the indication is, for example, more rapid than using detection frame/s and/or imaging to identify location of the object.

Optionally, in some embodiments, intensity of light received is used to determine and/or verify the range e.g. a higher intensity being understood to be associated with a smaller range e.g. a larger number of pixels experiencing a pixel event.

In some embodiments, timestamps are used to extract a light source modulation signal. For example, where, in some embodiments, timestamps are used in pulse repetition frequency (PRF) technique/s are employed using timestamps.

For example, where timestamps are used to identify the light source producing the detected light. For example, where the time data for detected pulses is compared with known signature information for a plurality of light sources to identify which light source, is being detected.

Optionally, in some embodiments, intensity of light received is used (e.g. additionally to timing information) to identify and/or verify a light source. Where the known signature information, in some embodiments, includes intensity information.

Optionally, for example, prior to using timestamps to extract a light modulation signal, a timestamp signal is used as a wake-on-demand mechanism to recognize when a laser is present.

A potential advantage of using pixel event detection for monitoring is low power consumption of the monitoring.

A potential advantage of using pixel event detection is increased speed e.g. compared to evaluating an entire detection frame to find timing of arrival.

FIG. 4 is a simplified schematic block diagram of an imaging system 400, according to some embodiments of the disclosure.

In some embodiments, system 400 includes a detector array 410 (e.g. including one or more features of detector array 210 FIG. 2A) and a PCA 451 (e.g. including an array of pixel circuits including one or more features of PCA 151 FIG. 1).

In some embodiments, system 400 includes one or more light source 423, where, light source 423, in some embodiments, includes a laser configured to emit pulses of laser light towards a field of view (FOV) of system 400. In some embodiments, light source 423 produces light of pulse duration of 1 ns-1 μs, or 1 ns-500 ns, or lower or higher or intermediate pulse durations or ranges. In some embodiments, light source 423 produces laser light pulses of intensity between 1 ke-100 ke, or lower, or higher, or intermediate ranges, or intensities.

In some embodiments, detector array 410 produces a measurement signal 454 for each detector of detector array 410. In some embodiments, PCA 451 receives measurements 454 e.g. one or more measurement signal is received from detector/s to each pixel circuit of PCA 451.

In some embodiments, PCA 451 passes a plurality of image signals 450 to a processing and memory circuitry (PCM) 441 which, for example, includes a controller. Where, in some embodiments, each image signal corresponds to a single pixel circuit and/or detector pixel.

In some embodiments, system 400 includes one or more power supply 419. For simplicity of illustration, although power supply/ies 419, in some embodiments, supply other element/s of system 400 (e.g. one or more of laser source 423, and user interface/s 443), only power supply 419 connection to ROIC 411 is illustrated.

In some embodiments, system 400 includes a detection circuit 422 which measures and/or detects electrical fluctuation/s at connection/s 470 to pixel circuit/s 411 where the electrical fluctuation/s are associated with pixel event/s. For example, where ROIC 411 includes one or more element 419-1, 419-2, connected to pixel circuit/s of PCA 451. Where, in some embodiments, connections 470 include power supply connection/s (e.g. to latch/es and/or amplifiers) and/or control signal connection/s (e.g. voltage reference/s to comparator/s). In some embodiments, power supply connection/s are illustrated by arrows between components 419-1 and 419-2 and PCA 451, bidirectionality of the arrows, in some embodiments, indicating influence of PCA current consumption on power supply voltage e.g. causing fluctuation in the power supply voltage. In some embodiments, exemplary element/s 419-1, 419-2 include one or more of driver circuitry, power supply circuitry, and grounding.

FIG. 4, in some embodiments, illustrates sensing of voltage fluctuation at connection/s 470, however, in some embodiments, current fluctuation/s are sensed and/or surge/s in power consumption.

In some embodiments, connections 470 include connection to detection channels of a plurality of pixel circuits (e.g. as described regarding and/or illustrated in FIG. 7).

Optionally, in some embodiments, one or more pixel circuits of PCA 451 include two channels (e.g. corresponding to channels 766, 768, of pixel circuit 712 FIG. 7), through which measurement signals 454 pass. In some embodiments, a first, image channel emits an image signal and a second, detection channel emits a detection signal, PCA 451 thereby emitting a plurality of image signals 450 and a plurality of detection signals 458.

Optionally, in some embodiments, detection circuit 422 detects electrical fluctuation/s of connection/s to pixel circuit/s at a per pixel circuit level, for example, by interfacing with the detection channels of the pixel circuits (e.g. as illustrated in and/or described regarding FIG. 7) and illustrated in FIG. 4 as a connection between detection circuit 422 and PCA 451.

In some embodiments, a global timing circuit (GTC) 418 receives a signal 464 from detection circuit 422 upon detection circuit 422 identifying a pixel event. In some embodiments, upon receipt of signal 464 from detection circuit 422 GTC 418 generates a time stamp 434 which is then sent to PMC 441.

In some embodiments, GTC 418 includes a counter which is reset upon receipt of trigger 417, and stopped to produce timestamp 434, upon receipt of a signal 464 from detection circuit 422.

In some embodiments, GTC 418 provides a plurality of timestamps, for a plurality of signals 464 received, e.g. sequentially from detection circuit 422. In some embodiments, detection circuit 422 and/or GTC 418 continuously provide detection and timestamping of pixel events. In some embodiments, GTC 418 includes a plurality of counters. Where, for example, the counters are reset by receipt of trigger 417 and stopped to produce timestamps 434 one for each of a plurality of sequentially received signals 464 from detection circuit 422.

A potential advantage of a plurality of timestamps is the ability to identify pixel events associated with self-reflection and/or different reflection paths.

Where, in some embodiments, the timestamp is used to identify that the reflection is a reflection of the laser light from element/s of the system itself e.g. where, in some embodiments, such a reflection is identified as occurring too rapidly (e.g. under a threshold amount of time) after emission of the laser pulse.

Where, in some embodiments, PMC 441 processes the plurality of timestamps e.g. to identify path/s of emitted laser pulses 423 e.g. to identify direct reflection path/s from an object and/or multiple reflection paths (e.g. from a plurality of objects).

Where, in some embodiments, PMC 441 includes a rangefinder unit, which uses known timing 424 of emission of a laser pulse and timestamp 434, to determine a distance (also herein termed "range") between an object and one or more portion of system 400 (e.g. light source 423 and/or detector array 410).

In some embodiments, PMC 441 generates a synchronization trigger signal 417 (also herein termed "trigger signal", "trigger", "synchronization signal"). Where, in some embodiments, trigger signal 417 is used to control timing of detection and/or timestamping at detection circuit 422 and GTC 418 respectively.

In some embodiments, synchronization trigger 417 initiates the GTC 418, which is subsequently sampled and/or terminated by the detection circuit 422 when a pixel event is detected, to associate a timestamp 434 with the pixel event, the timestamp e.g. indicating a time elapsed since initiation.

In some embodiments, PMC 441 controls operation of light source 423, sending control signal/s 424 to light source 423. In some embodiments, trigger 417 is used to control timing of emission of laser pulse/s at light source 423.

In some embodiments, PMC 441 triggers GTC 418 in response to activation of the laser. Alternatively, in some embodiments, triggering of GTC 418 is independent of control of the laser.

For example, in some embodiments, PMC 441 initiates GTC 418 using trigger signal 417, in response to activation of light source 423.

In some embodiments, operation of laser source 423 results in generation of a detection enable signal 417.

Where, in some embodiments, laser source 423 produces a trigger signal 424 e.g. upon and/or after emitting a laser pulse. Where trigger signal 424 is received by PMC 441 which then, in some embodiments, generates and sends a detection enable signal 417, for enabling the detector, e.g. after a known time offset to the time of operation of the laser.

Where, in some embodiments, a detection enable signal 417 is generated (e.g. by PMC 441) for enabling the detector, e.g. after a known time offset to the time of operation of the laser. For example, a laser control signal 424 being sent prior to trigger signal 417.

In FIG. 4, arrow 424 is drawn as a double headed arrow to illustrate both detection enable signal 417 generation scenarios described in the previous two paragraphs.

In some embodiments, the known time offset is small, for example 1 ns-100 μs or lower or higher or intermediate ranges or time durations, for example in an order of nanoseconds (e.g. 1-500s, or lower or higher or intermediate ranges or time durations), whist, in some embodiments, being long enough to avoid sensing of the light emission as a pixel event.

In some embodiments, PMC 441 includes an image processing unit (IPU) which receives and processes imaging signals 450 to produce data for an image. Where, in some embodiments, the data, in some embodiments, is provided for display of an image associated with the data by one or more user interface 443.

Optionally, in some embodiments, additional information is output e.g. provided for display at user interface/s 443 e.g. range information determined from timing information 434.

Optionally, in some embodiments, PMC 441 includes a detection frame generation unit which constructs detection frame/s from detection signals.

Where, in some embodiments, detection frame/s are provided e.g. for display at user interface/s 443. For example, in some embodiments, detection frame information is superimposed on image/s displayed at user interface/s 443.

Optionally, in some embodiments, detection circuit 422 and/or GTC 418 produces a signal having an indication as to an intensity of the sensed electrical fluctuation at connection/s to the pixel circuit/s. Which intensity, in some embodiments, indicates a number of pixels detecting the laser signal (e.g. number of pixels having a pixel event).

In some embodiments, the intensity signal is used to identify and/or verify a laser source being detected (e.g. refer to step 308 FIG. 3). In some embodiments, the intensity signal is used, e.g. along with timestamp/s to determine a range (e.g. refer to step 308 FIG. 3). Where, for example, a higher intensity is taken to indicate a smaller range e.g. the closer the target, the larger the number of pixels involved in detection.

In some embodiments, system 400 includes a ROIC 411 which, in some embodiments, hosts PCA 451, and optionally, one or more portion of detection circuit 422, GTC 418, and PMC 441.

FIG. 5 is a method of imaging and detection, according to some embodiments of the disclosure.

FIG. 6 includes simplified schematic illustrations of imaging, according to some embodiments of the disclosure.

FIG. 6 illustrates an emitted laser pulse 658 arriving at an object 656 in an FOV of a detector array, an image 660 produced, and a detection frame 662 both produced using detector array measurement data of the FOV.

In some embodiments, image 660 (e.g. as corresponding to positive region/s of detection frame 662) provides context regarding where in space the laser spot (e.g. and hence the target) is located.

Optionally, range information is displayed on and/or with detection frame 662 and/or image 660. For example, as described regarding step 510 and/or step 512.

In some embodiments, detection and imaging frames are displayed over time e.g. as video feeds, e.g. a detection video including a plurality of detection frames e.g. an imaging video including a plurality of images.

Referring now to FIG. 5, at 500, in some embodiments, timing information regarding emission of a laser pulse is received. For example referring to FIG. 6, timing of emission of laser pulse 658. Where, in some embodiments, a light source system is independent of a detection system, e.g. where a triggering signal is sent from the light source system to the detection system. In some embodiments, the laser light emitted has a narrow beam, and is herein termed "spot" or "laser spot". In some embodiments, an object 656 reflects a portion of laser pulse 658 towards a detector array.

At 502, in some embodiments, an electrical fluctuation in a connection signal is associated with arrival of the reflected laser pulse at a detector array.

At 504, in some embodiments, light is detected using the array of detectors. Where the plurality of detectors produce a plurality of measurement signals.

In some embodiments, the light detected is ambient light. In some embodiments, the light detected includes the reflected laser light pulse. In some embodiments, the light detected includes reflected illumination light (e.g. where the system includes an illumination source other than the pulsed laser light source e.g. a broader range light source e.g. illuminating with infrared and/or visible light).

In some embodiments, steps 502 and 504 occur simultaneously.

At 505, in some embodiments, range between object 656 and the detector array is determined using timing of electrical fluctuation with respect to time of emission of laser pulse 658.

At 506, in some embodiments, measurement signals are filtered to produce detection data e.g. for each pixel circuit and/or detector) which is processed to produce a detection frame 662 showing laser light 658 reflection from object 656.

For example, referring to FIG. 7, where, for a plurality of pixel circuits 712 an associated detection signal 754 passes through detection channel 768 of the pixel circuit, after which, in some embodiments, the detection data, for one or more pixel circuit 712 is processed to produce detection frame 662.

At 508, in some embodiments, measurement signals are processed (e.g. accumulated and/or integrated) to produce image data (e.g. for each pixel circuit and/or detector) which is processed to produce an image 660 of object 656.

For example, referring to FIG. 7, where, for a plurality of pixel circuits 712 an associated detection signal 754 passes through image channel 766 of the pixel circuit, after which, in some embodiments, the image data, for each pixel circuit is processed to produce image 660.

In some embodiments, steps 506 and 508 occur simultaneously e.g. where measurement signals are directed into an imaging channel and a detection channel e.g. by a same element (e.g. front end circuit 725 directs a signal into both imaging channel 766 and detection channel 768 FIG. 7).

At 510, optionally, in some embodiments, detection data is combined with timing data. For example, where, in some embodiments, range information is provided with detection data (e.g. detection frame/s) where the timing data (e.g. range information), in some embodiments, is associated with individual pixel/s of the detection frame/s. In some embodiments, range information is displayed along with detection data e.g. where range information is displayed along with a detection frame e.g. where a detection frame is annotated to indicate distance to portion/s (e.g. pixel/s) of the detection frame.

At 512, optionally, in some embodiments, for example, additionally or alternatively to combining with detection data (e.g. as described in step 510), timing data is combined with image data. Where, for example, in some embodiments, the timing data and image data are provided together, for example, where each portion of timing data is associated with a pixel/s of one or more image. For example, where provided data is used to display range information along with an image e.g. the image is annotated to indicate distance to portion/s of (e.g. pixels) the image.

In some embodiments, associated timing data and image data are for a same time period. However, in some embodiments, a detection frame rate is higher than an imaging frame rate. Where, in some embodiments, multiple pixel events, sensed in multiple detection time periods are associated with (e.g. provided and/or displayed with, optionally along with detection data) image data (e.g. a single image).

FIG. 7 is a simplified schematic of a portion of a system 700 including a plurality of pixel circuits 712 and a detection circuit 722, according to some embodiments of the disclosure.

In some embodiments, each pixel circuit receives a signal from one or more detector (e.g. detector 210-1 FIG. 2A). Where, for ease of illustration, in FIG. 7, a single detection signal 754 is illustrated as being received by a pixel circuit 712. Where, in some embodiments, detection signal 754 includes a photocurrent indicative of detector pixel/s having been impacted by a laser pulse, and/or to pixel/s being illuminated by an imaging source such as infra-red and/or ambient light.

In some embodiments, pixel circuit 712 includes a front-end circuit 725, such as detailed in U.S. Pat. No. 9,215,386 or IL262372 both of which are hereby incorporated by reference in their entirety.

Where, in some embodiments, front-end circuit 725 is configured to generate and/or obtain respective electric signals indicative of the pixel photocurrents. Where front-end circuit 725, in some embodiments, is configured with any suitable type of photo detection front end circuitry scheme such as optionally: direct injection (DI) circuits, buffered direct injection (BDI) circuits, capacitive trans-impedance amplification (CTIA) circuits, source follower (SF) circuits and combinations thereof.

Where, in some embodiments, front-end circuit 725 receives detection signal 754.

In some embodiments, detection signal 754 passes from front-end circuit 725 through an image channel 766 including, for example, an accumulator 726 which integrates the signal followed by a buffer 727 which buffers the integrated signal, before being output (e.g. with other imaging channel outputs of pixel circuits 711) as an image signal 750. Where, in some embodiments, accumulator 726 integrates the signal.

In some embodiments, detection signal 754 passes from front-end circuit 725 through a detection channel 768. Which detection channel 768, in some embodiments, includes a pre-processing unit 728, configured to detect a sharp short (e.g. over less than 10 µs, or over less than 5 µs, or less than 1µ, or lower, or higher, or intermediate durations, or ranges) change in photocurrent (e.g. most typically caused by a laser pulse). In some embodiments, pre-processing unit 728 is configured for other high intensity illumination source/s. In some embodiments, pre-processing unit 728 includes a band-pass filter configured to pass signals within a prescribed frequency band corresponding to a frequency of a laser source (e.g. a frequency band corresponding to that of light source 423 FIG. 4). Potentially, such filtering ensures that most of the photocurrent passed by the pre-processing unit 728 derives from the selected source (e.g. laser source), e.g. barring a small amount of noise falling in the same frequency band.

In some embodiments, detection channel 768 includes a latched comparator 729 which outputs a signal upon receiving an input exceeding a threshold.

In some embodiments, detection circuit 722 intercepts a connection 719 to PCA 751 where, in some embodiments, connection 719 is a shared electrical connection to a plurality of pixel circuits 712 of PCA 751.

Where detection circuit 722 receives signals 770 indicative of the electrical connection voltage level and/or current passing through electrical connection 719 and detects timing of electrical fluctuation/s associated with pixel events.

In some embodiments, connection 719 is a power supply connection where a surge in power consumption to one or more element of pixel circuit 712 is used to record and/or measure timing of pixel event/s.

In some embodiments, connection 719 is a reference voltage or current reference e.g. supplied to a same component of the plurality of pixel circuits. For example, in some embodiments, connection 719 includes a power supply to latch/s (not illustrated) e.g. a plurality of latches e.g. associated with a plurality of pixel circuits, e.g. one for each pixel circuit of a plurality of pixel circuits (e.g. as described hereinbelow). For example, additionally or alternatively, in some embodiments, connection 719 includes a power supply to an amplifier (not illustrated where, in some embodiments, detection channel 768 includes an amplifier) e.g. a plurality of amplifiers, e.g. associated with a plurality of pixel circuits, e.g. an amplifier for each pixel circuit of a plurality of pixel circuits. Alternatively or additionally, in some embodiments, connection 719 includes a connection to preprocessing unit 728 e.g. a plurality of pre-processing units, e.g. associated with a plurality of pixel circuits, e.g. a pre-processing unit for each pixel circuit of a plurality of pixel circuits.

Alternatively or additionally, in some embodiments, connection 719 includes connection of reference/s (e.g. voltage reference) supplied to comparator/s e.g. comparator 730. Alternatively or additionally, in some embodiments, connection 719 includes connection to a grounding connection for a plurality of pixel circuits. In some embodiments, connection 719 includes connection to a control signal to one or more element of a plurality of pixel circuits.

For example, in an exemplary embodiment (e.g. as illustrated by dashed line 770a) detection circuit 772 intercepts output of a power supply 719 (power supply 719 being, in some embodiments, a driver e.g. an on-chip driver) prior to it being fed to one or more one or more (e.g. each) latched comparator 729. Where, in some embodiments, power supply surge/s to one or more latches 731 and/or latched comparators 729 (e.g. at voltage driver/s not illustrated) e.g. upon a pixel event resulting in latch 731 changing state, are used to sense a surge in current and/or a decrease in voltage consequent to a pixel event.

In some embodiments, an electrical fluctuation associated directly with a pixel event (e.g. a change in state of latch 731) results in electrical fluctuation elsewhere in circuitry. For example, where cross talk (e.g. associated with parasitics e.g. parasitic capacitance) results in a fluctuation appearing in additional circuitry. For example, where, in some embodiments, a change in state of latch 731 and associated electrical fluctuation to the latch, in some embodiments, results in a measurable fluctuation at another connection (e.g. at connection/s to comparator 730). Where the measurable fluctuation is, in some embodiments, detected e.g. by detector 722 to determine timing of pixel event/s.

In some embodiments, alternatively or additionally to sensing surges in power consumption to latch 731 (e.g. multiple latches 731 each latch associated with a single pixel circuit 712) and/or latched comparator 729, power consumption surge/s are sensed at one or more of power supply to element/s of front end circuit 725, and element/s of pre-processing unit 728.

In some embodiments, comparator 730 is a latched comparator 729 including a latch 731. Which latch 731, in some embodiments, is a bistable latch 731, which changes state, upon receiving a signal from comparator 730, from an initial first level (typically logic '0') to a second level (typically logic '1') and latches the new state, outputting the second level e.g. if signal 754 includes a pixel event. For example, multiple latches, each associated with a pixel circuit 712 of PCA 751 producing a binary indication of whether or not the associated detector experienced a pixel event (e.g. was impacted by the laser light). Where, in some embodiments, PCA 751 outputs a plurality of latched comparator outputs 758 each, in some embodiments, corresponding to one or more detection signal.

In some embodiments, each pixel circuit of PCA 751 has both channels 766, 768, e.g. an image having a one-to one correspondence to a detection frame. Alternatively, in some embodiments, fewer than each pixel circuit of PCA 751 have detection channels 768, e.g. the detection frame having lower resolution than the image.

FIG. 8 is a detection method, according to some embodiments of the disclosure.

At 800, in some embodiments, detection is disabled. For example, prior to initiation of a GTC (e.g. GTC 118 FIG. 1, e.g. GTC 418 FIG. 4, e.g. GTC 718 FIG. 7).

At 802, in some embodiments, detection circuitry is synchronized with emission of a laser pulse. For example, where upon (and/or prior to) emission of a laser pulse, a light source unit sends a signal (e.g. trigger signal) to detection circuitry.

At 804, in some embodiments, upon emitting of a laser pulse (and/or in synchronization with) one or more portion of a detection channel is enabled, e.g. by a trigger signal (e.g. trigger signal 417 FIG. 4, e.g. trigger signal 717 FIG. 7). Where, referring to FIG. 7, in some embodiments, pre-processing unit 728 and/or latched comparator 729, in some embodiments, are enabled by synchronization signal 717, for example, being normally disabled.

In some embodiments, upon emitting of the laser pulse, a detection circuit and/or GTC is enabled e.g. by a trigger signal (e.g. trigger signal 417 FIG. 4, e.g. trigger signal 717 FIG. 7).

A potential advantage of enabling detection circuitry upon emission of laser pulse/s is potential reduction in false detection of pixel event/s e.g. associated with noise and/or optical reflection/s.

At 806, optionally, in some embodiments, pixel event detection is disabled, for example, after a frame time.

Where, in some embodiments, detection is enabled at the start and disabled at the end of each frame, e.g. for a plurality of frames.

FIG. 9A is a simplified schematic of a detection circuit 922, according to some embodiments of the disclosure.

In some embodiments, detection circuit 922 receives a power supply signal 970 which, in some embodiments, includes one or more feature of power supply signal 170 FIG. 1, and/or of power supply signal 470 FIG. 4, and/or of power supply signal 770 FIG. 7. For example, in some embodiments, power supply signal 970 is an output of a driver providing power to one or more pixel circuits e.g. latched comparator/s of pixel circuit/s.

Where, in some embodiments, power supply signal includes connections to power supply for a plurality of latched comparators, each latched comparator associated with a pixel circuit, e.g. referring to FIG. 7 latched comparator 729 of pixel circuit 712 providing power supply signal 770 (along with other pixel circuits).

In some embodiments, power supply signal 770 is compared with a reference voltage $V_{REF1}$. Where, in some embodiments, the comparison is performed by a comparator 933. In some embodiments, when a voltage of power supply signal 970 drops below $V_{REF}$ a signal is sent (e.g. comparator 933 changes state) from detection circuit 922 e.g. to a GTC 918 (GTC 918 including, in some embodiments, one or more feature of GTC 118 FIG. 1 and/or GTC 118 FIG. 1).

FIG. 9B is a simplified schematic of a detection circuit 923, according to some embodiments of the disclosure.

Where, in some embodiments, detection circuit 923 is connected to a power supply 919 and a pixel circuit array (PCA) 951.

In some embodiments, current surges in power supply consumption are identified, for example, by measuring power supply current through a charge sensing unit 932 (e.g. as a change in voltage $\Delta V$) and comparison with the voltage change input with a reference voltage $V_{REF}$ e.g. by a comparator 916. Where, in some embodiments, a signal (e.g. comparator 916 changes state) is emitted from detection circuit 923 (e.g. to GTC 918) if current rises above a threshold (the threshold as defined e.g. feature/s of charge sensing unit 932 and/or a value of $V_{REF}$).

Where in some embodiments, charge sensing unit 932 includes one or more resistor and/or capacitor and/or amplifier. For example, in some implementations, charge sensing unit 932 including a resistor to convert a current supply signal 919 to PCA 951 to a voltage for comparison at comparator 916.

FIG. 9C is a calibration method, according to some embodiments of the disclosure.

At 900, in some embodiments, data regarding a light source is received. For example, the data received includes one or more feature as described regarding step 300 FIG. 3.

At 902, in some embodiments, a plurality of timestamps are produced, each timestamp corresponding to detection of light.

At 904, in some embodiments, one or more threshold (e.g. $V_{REF}$ FIG. 9A and/or FIG. 9B) is changed until, for an emitted laser pulse, detection circuitry provides a single detection, at most, e.g. during a frame time.

Alternatively, or additionally, in some embodiments, the one or more threshold are changed and/or selected balancing a tradeoff between potentially reducing a false detection rate and increasing sensitivity (e.g. of range finding using the detection).

Where, in some embodiments, the threshold is set for detection only at a certain intensity corresponding to a plurality of pixels experiencing pixel events.

Figure 10:
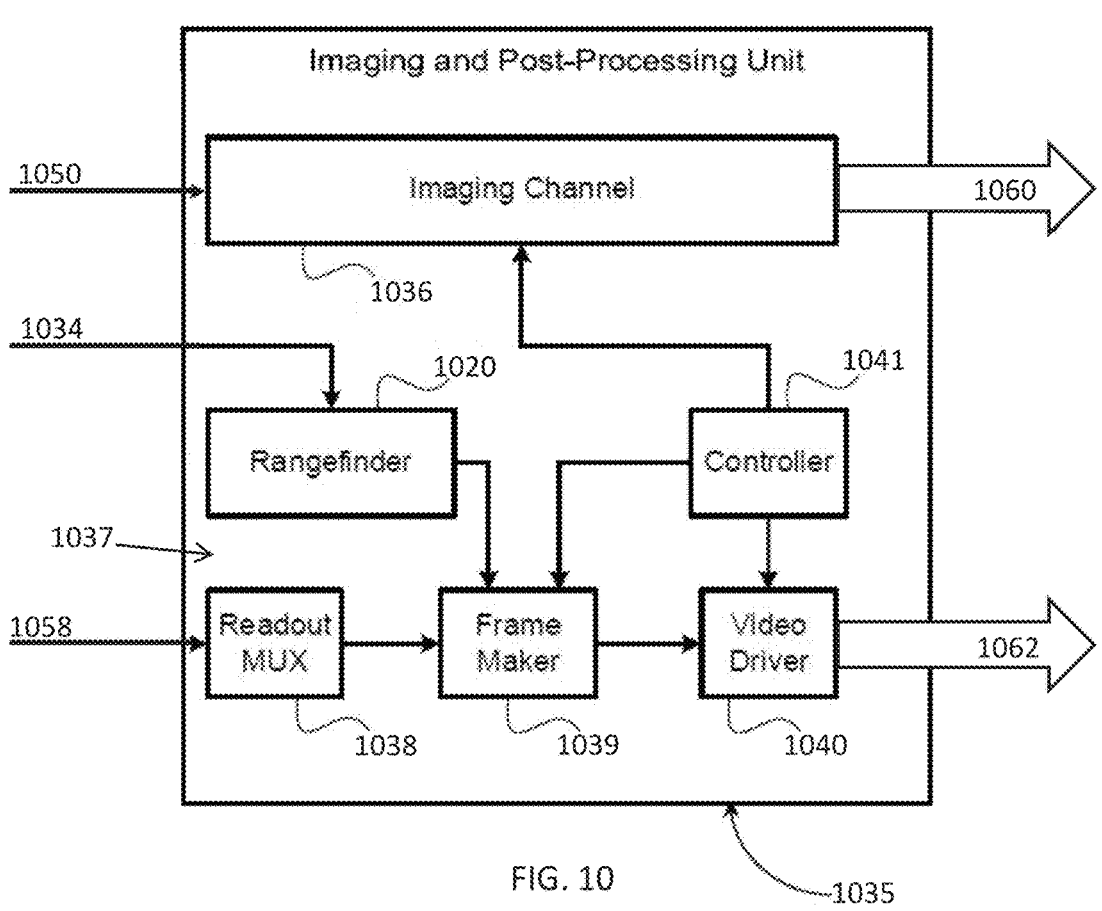
FIG. 10 is a simplified schematic block diagram of an image and post-processing circuit, according to some embodiments of the disclosure.

FIG. 10 is a simplified schematic block diagram of an image and post-processing circuit 1035, according to some embodiments of the disclosure.

Figure 11:
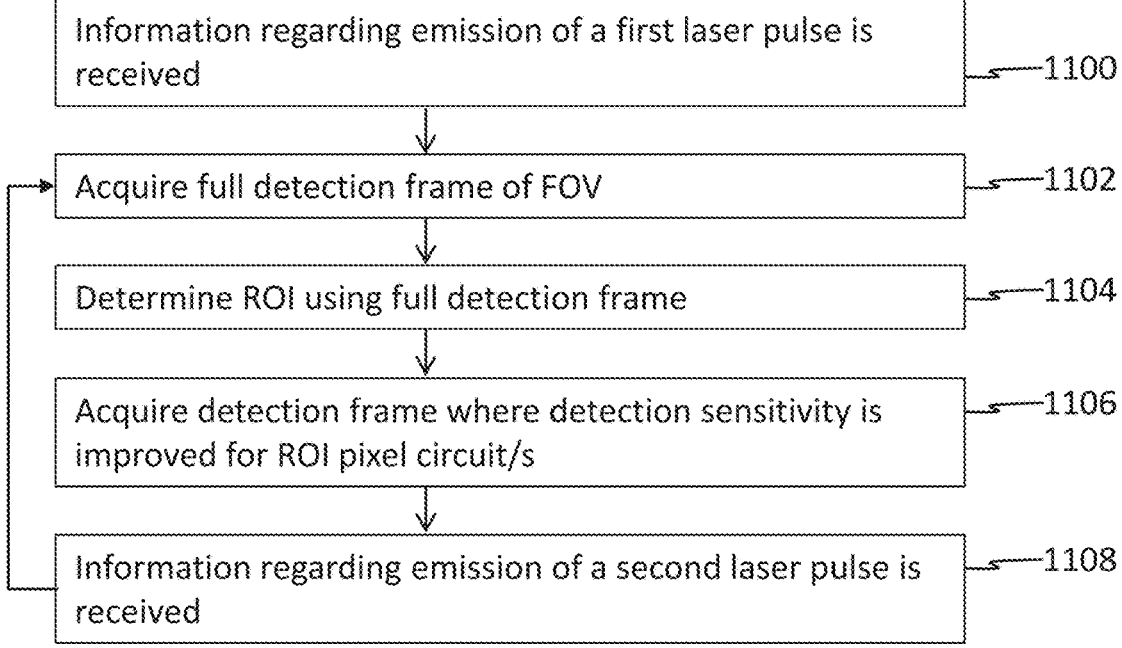
FIG. 11 is a method according to some embodiments of the disclosure.

In some embodiments, imaging, and post-processing unit (IPPU) 1035 is external to a ROIC e.g. ROIC 111 FIG. 11. Alternatively, in some embodiments, at least a portion of IPPU 1035 is hosted by an integrated circuit hosting a ROIC according to aspect/s of this disclosure.

In some embodiments, IPPU is at least partially hosted by PMC (e.g. PMC 441 FIG. 4, e.g. PMC 741 FIG. 7).

In some embodiments, IPPU 1035 includes an imaging channel 1036. Where imaging channel 1036 receives a plurality of image signals 1050 e.g. an image signal from each pixel circuit (e.g. image signal 450 FIG. 4, e.g. image signal 750 FIG. 7). In some embodiments, imaging channel 1036 processes image signals 1050 to produce images (e.g. image 660 FIG. 6). Where, in some embodiments, imaging channel 1036 produces a video frame output 1060 which includes a plurality of images. In some embodiments, image processing is performed (e.g. by imaging channel 1036) according to description in U.S. Pat. No. 9,215,386 which is incorporated by reference in its entirety.

In some embodiments IPPU 1035 includes a detection channel 1037 which receives a plurality of latch outputs 1058 (e.g. corresponding to outputs 758 FIG. 7) and which processes latch outputs 1058 to produce a detection frame (e.g. detection frame 662 FIG. 6). Where, in some embodiments, detection channel 1037 produces a video output 1062 from a plurality of detection frames.

In some embodiments, detection channel processing is provided by a readout multiplexer 1038 and a frame maker 1039. Where, for example, latch outputs 1058 are coupled to inputs of readout multiplexer 1038. Readout multiplexer 1038, in some embodiments, feeding a binary logic level of each latch (e.g. in turn) to a frame maker 1039, which frame maker 1039, in some embodiments reconstructs a detection frame (e.g. detection frame 662 FIG. 6).

In some embodiments, the detection frame (e.g. detection frame 662 FIG. 6) corresponds to an image output (e.g. image 660 FIG. 6) by the imaging channel 1036.

Where, for example, pixels or clusters of the detection frame whose value is logic "1" correspond to a location in the image impacted by the laser spot.

In some embodiments, a rangefinder 1020 receives timestamp/s 1034 (for example, from a GTC e.g. GTC 121 FIG. 1, e.g. GTC 421 FIG. 4, e.g. GTC 721 FIG. 7) e.g. timestamp/s 1034 associated with each detection frame. In some embodiments, rangefinder 1020 determines range, e.g. based on timestamp data 1034.

In some embodiments, range data is combined with detection data. For example, where, in some embodiments, range data is combined with detection frames e.g. provided together e.g. for display. For example, in some embodiments, frame maker 1039 relays timestamp data 1034 with information identifying the active pixel or cluster. For example, to a video driver 1040, which creates a video frame showing the active pixels or clusters in their proper spatial context together with their respective range data.

In some embodiments, IPPU 1035 includes a controller 1041 which is configured to control timing of display. In some embodiments, controller 1041 defines a time for display of a new detection frame and synchronizes it with display of a corresponding video frame that is outputted from imaging channel 1036.

In some embodiments, controller 1041 determines how timestamp/s 1034 are combined with the detection frame e.g. by frame maker 1039.

For example, in some embodiments, the detection frame comprises a frame header that operates as a preamble to the detection data for each pixel circuit detection channel (e.g. detection data signifying the level of each latch e.g. latch 731 FIG. 7). In some embodiments, the frame header contains general information of the frame setup and/or multiple or single timestamp data or an indication of "no timestamp found" if no pixel event was registered by a GTC in the corresponding current detection frame period.

In some embodiments, image video frame output 1060 (e.g. including a plurality of images e.g. image 660 FIG. 6) by the imaging channel 1036 and detection video output 1062 from video driver 1040 (e.g. including a plurality of detection frames) is displayed separately e.g. as two different videos e.g. on more than one display. Alternatively, or additionally, the two videos are combined, e.g. where the images and detection frames are provided together e.g. where each image is associated with one or more detection frame, for example, to illustrate (e.g. highlight) on an image video where object/s were illuminated by the laser spot.

FIG. 11 is a method according to some embodiments of the disclosure.

At 1100, in some embodiments, timing information regarding emission of a laser pulse towards a target is received (e.g. according to one or more feature of step 500, FIG. 5).

At 1102, in some embodiments, a detector array senses light from a FOV including the target. Where the sensor signals are processed to produce, for each detector, detection data (and, optionally, image data) indicative of a part of the detector array sensing the first laser pulse reflected from the target.

At 1104, in some embodiments, a region of interest (ROI) is identified from the detection data. For example, where ROI is a sub-portion of the detector array which experienced a pixel event, where, in some embodiments, sub-portions are predetermined regions of the detector array. For example, where ROI includes those pixels which experienced a pixel event.

At 1106, in some embodiments, a detection sensitivity, for pixel circuits of the ROI is increased. Where, in some embodiments, sensitivity of detection of pixel events is increased.

For example, by decreasing time constant/s of one or more portion/s of detection channels of the pixel circuits of the ROI. Where, in some embodiments, time constant/s are reduced for one or more of a front-end circuit (e.g. front-end circuitry 725 FIG. 7) and/or a pre-processing unit (e.g. pre-processing unit 728 FIG. 7) and/or a latched comparator (e.g. latched comparator 729 FIG. 7) of pixel circuit/s of the ROI. Where, in an exemplary embodiment, time constant/s are reduced by increasing current supply e.g. by changing current reference value/s (also herein termed "bias" value/s) provided by one or more drivers to the PCA. Where, for example, the current reference value/s define current consumption of front-end/pre-processing units.

For example, alternatively or additionally, by decreasing the number of rows and/or columns of the pixel array circuit being used in detection to reduce the detection frame read period. A reduction in the frame duration potentially providing more accurate timestamping e.g. and higher accuracy rangefinding, e.g. at the expense of reduced spatial resolution.

At 1108, in some embodiments, in some embodiments, timing information regarding emission of a second laser pulse towards a target is received, and step 1102 is repeated to produce, a second (e.g. partial) detection frame having higher detection sensitivity at the ROI.

General

As used within this document, the term "about" refers to ±20%. The terms "comprises", "comprising", "includes", "including", "having" and their conjugates mean "including but not limited to". The term "consisting of" means "including and limited to".

As used herein, singular forms, for example, "a", "an" and "the" include plural references unless the context clearly dictates otherwise.

Within this application, various quantifications and/or expressions may include use of ranges. Range format should not be construed as an inflexible limitation on the scope of the present disclosure. Accordingly, descriptions including ranges should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within the stated range and/or subrange, for example, 1, 2, 3, 4, 5, and 6. Whenever a numerical range is indicated within this document, it is meant to include any cited numeral (fractional or integral) within the indicated range.

It is appreciated that certain features which are (e.g., for clarity) described in the context of separate embodiments, may also be provided in combination in a single embodiment. Where various features of the present disclosure, which are (e.g., for brevity) described in a context of a single embodiment, may also be provided separately or in any suitable sub-combination or may be suitable for use with any other described embodiment. Features described in the context of various embodiments are not to be considered essential features of those embodiments, unless the embodiment is inoperative without those elements.

Although the present disclosure has been described in conjunction with specific embodiments thereof, it is evident that many alternatives, modifications, and variations will be apparent to those skilled in the art. Accordingly, this application intends to embrace all such alternatives, modifications and variations that fall within the spirit and broad scope of the appended claims.

All references (e.g., publications, patents, patent applications) mentioned in this specification are herein incorporated in their entirety by reference into the specification, e.g., as if each individual publication, patent, or patent application was individually indicated to be incorporated herein by reference. Citation or identification of any reference in this application should not be construed as an admission that such reference is available as prior art to the present disclosure. In addition, any priority document(s) and/or documents related to this application (e.g., co-filed) are hereby incorporated herein by reference in its/their entirety.

Where section headings are used in this document, they should not be interpreted as necessarily limiting.

The invention claimed is:

1. An imaging system, comprising:

an optical detector pixel array configured to provide a plurality of optical measurement signals of a field of view (FOV);

a pixel circuitry array (PCA) comprising a plurality of pixel circuits, each of the plurality of pixel circuits associated with a pixel of said optical detector pixel array and configured to receive an optical measurement signal of said plurality of optical measurement signals;

at least one electrical connection to and shared by at least two pixel circuits of said plurality of pixel circuits, said at least two pixel circuits associated with at least two detector pixels of said detector pixel array respectively; and a detection circuitry configured to detect, at said at least one electrical connection, electrical fluctuation associated with receipt at said optical detector pixel array of a pulse of laser light.

2. The imaging system according to claim 1, further comprising a global timing circuitry configured to timestamp said electrical fluctuation.

3. The imaging system according to claim 1, wherein said at least one electrical connection includes power supply connection to said at least two pixel circuits.

4. The imaging system according to claim 1, wherein said at least one electrical connection includes reference voltage supplied to said at least two pixel circuits.

5. The imaging system according to claim 1, wherein said detection circuitry is configured to associate said electrical fluctuation with one or more of said plurality of pixel circuits.

6. The imaging system according to claim 2, wherein said global timing circuitry is configured to associate said timestamp with one or more of said plurality of pixel circuits.

7. The imaging system according to claim 2, wherein more than one of said plurality of pixel circuits each have a detection channel of a plurality of detection channels.

8. The imaging system according to claim 7, wherein said plurality of detection channels provide detection data.

9. The imaging system according to claim 8, wherein said plurality of detection channels are configured to pass said detection data to one or more frame maker for construction of a detection frame, where each detection channel is associated with a pixel of said detection frame.

10. The imaging system according to claim 9, wherein said timestamp is associated with one or more pixels of said detection frame.

11. The imaging system according to claim 10, configured to communicate with a laser source configured to direct pulses of laser light towards said FOV, at known times;
    wherein said receipt at said optical detector pixel array is of portion of a pulse of laser light emitted by said laser source and reflected by an object within said FOV.

12. The imaging system according to claim 11, further comprising processing and memory circuitry configured to determine a range between one or more component of said system and said object using said timestamp and said known times.

13. The imaging system according to claim 7, wherein said connection is a connection to more than one detection channel of said plurality of detection channels.

14. The imaging system according to claim 7, wherein:
    at least a proportion of said plurality of pixel circuits each has an imaging channel configured to provide image data;
    the imaging system comprises processing and memory circuitry (PMC) including an image processing unit; and each said imaging channel is configured to pass image data to said image processing unit for construction of an image.

15. The imaging system according to claim 14, wherein said detection data and said image data are provided associated with each other; wherein each pixel of said detection data is associated with one or more pixels of said image data.

16. The imaging system according to claim 2, wherein said detection circuitry is configured to detect a plurality of surges in power consumption;
    wherein said global timing circuitry is configured to provide a plurality of timestamps, a timestamp for each of said plurality of surges.

17. The imaging system according to claim 16, further comprising processing and memory circuitry (PMC) configured to identify a laser source using said plurality of timestamps.

18. The imaging system according to claim 2, wherein said global timing circuitry comprises a counter where the counter value upon detection of said fluctuation provides said timestamp.

19. A readout integrated circuit (ROIC), comprising:
    a pixel circuitry array (PCA) comprising a plurality of pixel circuits, each pixel circuit configured to receive an optical measurement signal from a detector of an optical detector pixel array;
    at least one electrical connection to and shared by at least two pixel circuits of said plurality of pixel circuits;
    a detection circuitry configured to detect, at said at least one electrical connection, electrical fluctuation in power consumption associated with receipt at said optical detector pixel array of a pulse of laser light; and
    a global timing circuitry configured to timestamp said electrical fluctuation in power consumption.

20. A method of imaging, the method comprising:
    acquiring a plurality of measurement signals of a field of view (FOV) using an array of optical detectors each detector producing a measurement signal of said plurality of measurement signals;
    detecting and timestamping an electrical fluctuation associated with receipt of a pulse of laser light at said array of optical detectors, where the detecting is of electrical fluctuation associated with the receipt of the pulse of laser light to the array of optical detectors and is performed at least one electrical connection to and shared by at least two optical detectors of the array of optical detectors;
    receiving an indication of timing of emission of laser light pulses towards said FOV; and
    determining a range between one or more component of said system and an object within said FOV reflecting at least a portion of said laser light pulses, using said timestamp and said indication of timing.

* * * * *